FIG. I.

United States Patent Office 3,804,824
Patented Apr. 16, 1974

3,804,824
PROCESS FOR PURIFYING ORGANIC AZO PIGMENTS BY CENTRIFUGATION OF AN AGGLOMERATE OF THE PIGMENT AND AN ORGANIC LIQUID FROM AN AQUEOUS SLURRY
Herbert R. Kaiser and Ronald G. Sonderhouse, Saginaw, Mich., assignors to Baker Perkins, Inc., Saginaw, Mich.
Filed Jan. 26, 1970, Ser. No. 5,695
Int. Cl. C09b 67/00
U.S. Cl. 260—208                                        6 Claims

ABSTRACT OF THE DISCLOSURE

A continuous process for purifying organic pigments including the steps of adding a water-immiscible affinitive organic liquid to an acidic aqueous slurry containing finely divided organic pigment and water soluble impurities, forming a suspension of an agglomerate of pigment and organic liquid in the aqueous solution and separating the aqueous solution, including the impurities, from the agglomerate of pigment and organic liquid by subjecting the solution to a centrifugal force field, and removing the organic liquid from the agglomerate paste.

This invention relates to the purification of organic pigments. Presently, in the manufacture of such pigments, the impurities, comprising color affecting salts and acid values which cling to the pigment after it is filtered out, are removed by repeated batch washings of the pigment filter cake which remains on the cloth filter conventionally used. This process is time consuming and unduly expensive.

A prime object of the present invention is to provide a process for continuously purifying organic pigments by removing certain water soluble salts and acid values during the pigment separation stage of manufacture.

It is another object of the present invention to provide an efficient and reliable process for treating azo pigment dispersed in solution with contaminants which leaves the pigment with an acceptable contaminant level of immaterial proportions.

Briefly, in accordance with the present invention, there is provided a process for purifying azo pigment by treating an aqueous slurry, containing finely divided azo pigment in which the contaminants are dissolved, with a water-immiscible organic liquid to form a suspension of an agglomerate of pigment and organic liquid in the aqueous solution, and then separating the agglomerate from the solution. The agglomerate is subsequently dried and the organic liquid evaporated to leave essentially a pure and neutral dry pigment.

Figure 1:
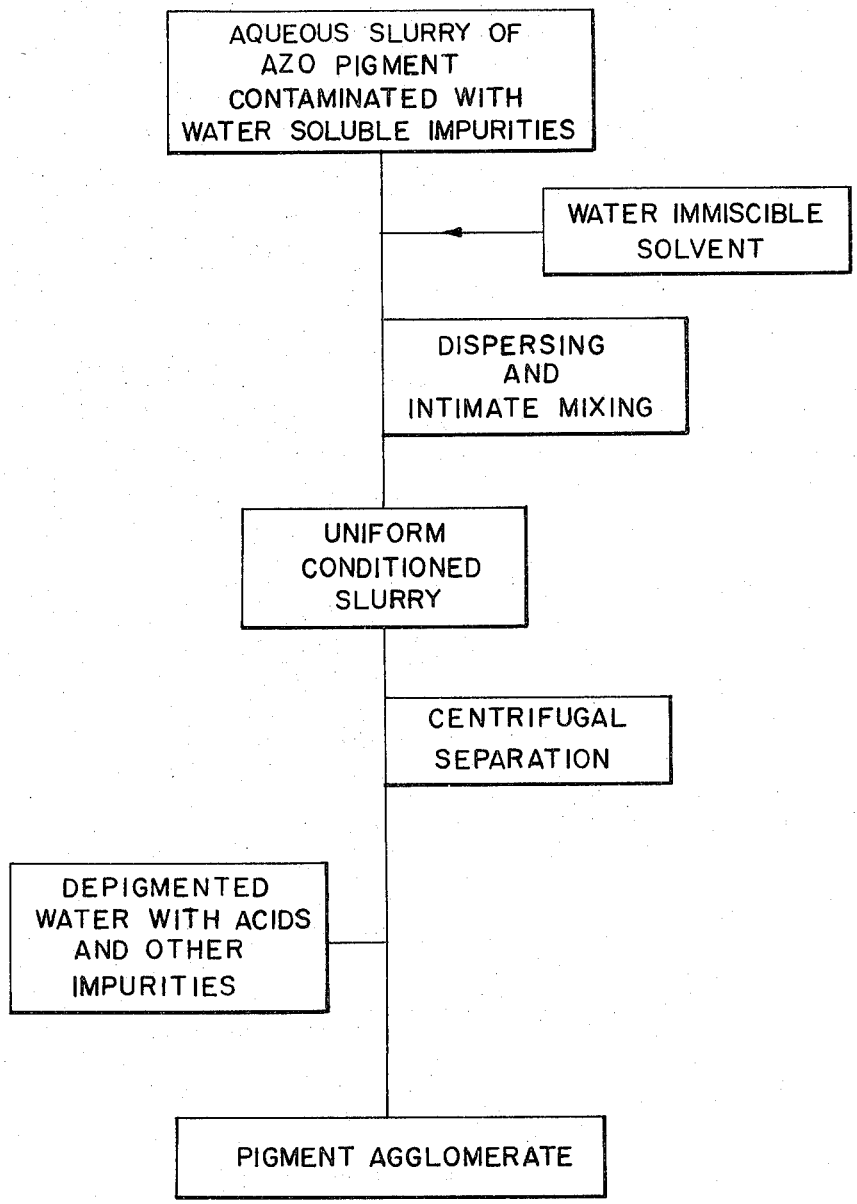
Figure 2:
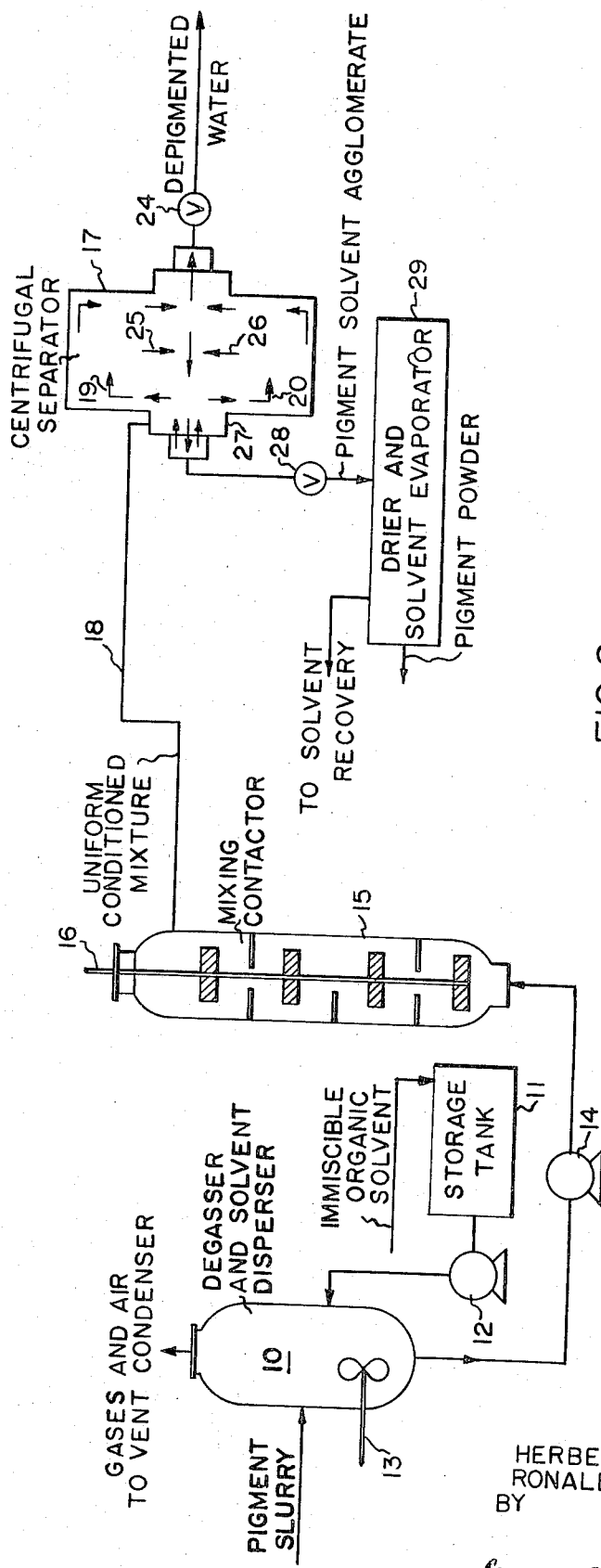

Other objects and advantages of the invention will be pointed out specifically or will become apparent from the following description when it is considered in conjunction with the appended claims and the accompanying drawings, in which:

FIG. 1 is a generalized flow sheet which illustrates the process in its general aspects; and FIG. 2 is a detailed flow sheet, illustrating a preferred embodiment of the process.

As shown in the flow sheet of FIG. 1, the present process may be used to purify and concentrate an azo pigment such as benzidine yellow, one of the family of organic azo pigments formed by coupling the tetrazonium salt of 3,3'-dichlorobenzidene with acetoacetarylides. The pigment, in the stage of the manufacturing process with which we are concerned, is present in a finely divided state in an aqueous acid slurry. A certain minimum quantity of a water-immiscible organic liquid which has a greater affinity for the pigment than the water in slurry is, first, thoroughly mixed with the slurry. In other words, an immiscible organic liquid should be selected which is capable of preferentially wetting the pigment. For example, a hydrocarbon solvent such as xylene can be used. Other possible hydrocarbon solvents are hexane, pentane, benzine, toluene and there are others. The organic liquid may be any compound which has a higher affinity for the pigment than the slurry liquid and which preferentially wets the pigment. To permit reuse of the organic liquid, it is desirable to employ an organic liquid which is volatile and readily evaporated from a pigment-water-organic liquid agglomerate. The organic liquid should have a density differing from water by at least 0.05.

In practicing the preferred process, the organic liquid, preferably xylene, is dispersed in and intimately mixed, with the slurry in the production of about 5% solvent by volume. In the mixing and contacting step, it is desirable to avoid stratification and to produce a substantially uniform suspension. Then the subsequent centrifugal separation step can produce essentially depigmented contaminated water as one phase and an agglomerate of pigment and organic liquid as another phase. The agglomerate or paste removed comprises about 10–15% by weight pigment, about 5–15% water by weight, and organic liquid. The pigment is separated as an agglomerate containing the organic liquid together with a minor amount of water, the quantity of water being very small compared to the quantity produced as depigmented water.

In one preferred embodiment of the process of this invention, a water slurry containing on the order of 4% by weight of dispersed pigment, and contaminated with acetic acid values and water soluble salts is treated. The pigment-water slurry can be processed to remove substantially all of the pigment from the water in the form of an agglomerate of pigment and organic liquid which is substantially ridded of the impurities. The agglomerate is then dried, and the organic liquid evaporated, to leave substantially decontaminated, dry, chemicaly neutral pigment.

In practicing the method of this invention, it is desirable to thoroughly mix the organic liquid with the pigment slurry, and to bring the organic liquid into intimate contact with the pigment so as to coat the pigment with the organic liquid. This mixing and contacting can be carried out in various kinds of well known high speed agitation apparatus. The mixing should be sufficient to bring the pigment into intimate contact with the organic liquid. The pigment and organic liquid form an agglomerate which is suspended in the aqueous solution.

As the next step in the process, the agglomerate is separated from the aqueous solution by introducing the mixture into a continuous centrifuge. This is accomplished by passing the mixture into a radially-extending enclosed space while the space is being rotated about an axis to provide a centrifugal force field. The mixture is introduced into the space at a radially intermediate position with respect to the inner and outer boundaries of the space. In the preferred embodiment, when the organic liquid has a density less than water, water substantially free of pigment is removed from the rotating space at a position radially outward from the suspension introduction position, and the agglomerate with the pigment is removed from the space at a position radially inward from the mixture introduction position. Preferably, the suspension is pumped under pressure into the rotating space, and the space is maintained at a super-atmospheric pressure.

In the specific embodiment of FIG. 2, there is shown a continuous plant for the recovery of pigment from an acidic aqueous slurry of azo pigments. An aqueous slurry of the character described which is formed in the manufacturing process is passed continuously to the tank 10 into which there is also continuously introduced a proportioned flow of the immiscible organic liquid. The organic liquid is stored in a tank 11, and pumped into a tank 10 by means of a pump 12. The tank 10 includes an agitator 13 which provides preliminary mixing and dispersion of the organic liquid. The tank 10 also functions as a degasser, provision being made for the removal of gases and air to a vent condenser through the top of the tank. The proportioned mixture is withdrawn from the bottom of the tank 10 by means of a pump 14, and is pumped into the bottom of a vertically extending mixing contactor 15 within which it flows upwardly through a series of compartments provided with agitator means. In the illustration given, contactor 15 is equipped with an agitator 16 which provides agitator paddles within the compartment. With this arrangement, the desired mixing energy will be applied to agitator 16 to intimately and homogeneously mix the contents.

The mixture is discharged continuously from the top of contactor 15 and passed at a uniform rate and pressure to a centrifugal separator 17 through a line 18 that communicates with the interior of the separator at a radially intermediate position as indicated by the arrow lines 19 and 20. A suitable separator for the purpose is well illustrated in U.S. Pat. 3,148,140 which is incorporated herein by reference. It will be understood that the centrifugal separator includes a rotor which provides a radially-extending enclosed space that is rotated about an axis to provide a centrifugal force field. The water, being the heavier phase, as compared with the agglomerate of pigment and organic liquid phase which is formed as a suspension, is thrown outwardly by centrifugal force. The depigmented water is removed from the outer portion of the rotor space as indicated by the arrow lines 21 and 22, the heavy phase outlet communicating with a passage discharging into a line 23 equipped with a valve 24.

The agglomerate is removed from separator 17 at a position radially inward from the introduction position as indicated at 25 and 26. The light phase outlets communicate with an external discharge line 27 which is equipped with a valve 28.

Preferably, the separator 17 operates as a sealed unit, that is, the space within the rotor does not communicate with the outside atmosphere except through the introduction and removal lines (viz. 18, 23 and 27). With this arrangement, the mixture can be introduced under pressure, and the rotating space maintained under superatmospheric pressure during the separation of the water and the agglomerate. In the operation of the device, the mixture will be introduced through line 18 at a higher pressure than the pressure of the light phase in line 27 or the heavy phase in line 23. Usually, the superatmospheric pressure within the separator will be maintained primarily by back pressure control on the light phase outlet line.

In the flow sheet of FIG. 2, the agglomerate or fluid paste discharged from the centrifugal separator 17 is shown as being passed to a dryer and solvent evaporator 29. The vapors from this unit comprising the organic covery unit, as indicated, thereby permitting the organic liquid and residual water, are passed to a solvent recovery unit, as indicated, thereby permitting the organic liquid to be returned to the process, for example, to storage tank 11. The pigment in the form of a powder is discharged from dryer 29.

In experimental work, water slurries containing on the order of 1–4% by weight of dispersed pigment have been successfully treated. When the slurry range is 1–4% by weight of dispersed pigment, the slurry should contain 1–10% organic liquid by volume in a porportion relating to the weight of the pigment in the slurry. Because the organic liquid has a greater affinity for the pigment, the water with its acid impurities is rejected by the pigment particles, and thus separated physically.

Some other organic liquids, lighter than water, which may be used are kerosene and heptane, and other organic liquids, heavier than water, which may be used are chloroform and ethylene dichloride. Of course, when a heavier than water organic liquid is used, it is the agglomerate which is removed from the rotating space at a position radially outward from the suspension introduction position and the depigmented water which is removed from the rotating space at a position radially inward from the mixture introduction position.

What is claimed is:

1. A process for treating an acidic aqueous solution containing organic azo pigment and some dissolved impurities comprising the steps of:
    adding to said solution a water immiscible pigment wetting organic hydrocarbon liquid, having a lesser density than water and wetting the pigment particles preferentially to water, and mixing said pigment wetting liquid with said solution until the pigment particles are coated with the organic liquid;
    introducing the resultant mixture into a radially enclosed space being rotated about an axis to form a centrifugal force field, said mixture being introduced into said space at a radially intermediate position with respect to the inner and outer boundaries of said space; and
    continuously separating from the space the acidic water including the impurities and, as a separate phase, an agglomerate of pigment and said organic liquid.

2. The process defined in claim 1 in which the conditioning liquid is separated from the pigment by evaporation and recycled.

3. The method set forth in claim 1 wherein the organic liquid is mixed with the slurry in the proportion of about 5% by volume and the agglomerate separated as a separate phase comprises about 10–15% pigment by weight, about 5–15% water by weight, and said pigment wetting organic liquid.

4. The process as set forth in claim 1 further including the steps of drying the agglomerate and evaporating the said organic liquid.

5. The process as set forth in claim 1 wherein said separating step includes the step of removing said agglomerate of said pigment and organic liquid at a position radially inward from said mixture introduction position, and removing said water with the impurities from a position adjacent the outer boundary of said space.

6. The process of claim 1 in which said organic liquid is xylene introduced in a ratio of about 5% by volume.

References Cited

UNITED STATES PATENTS

| 3,169,955 | 2/1965 | Siebert et al. | 260—176 |
| 2,564,225 | 8/1951 | Mayers | 260—208 X |
| 2,930,792 | 3/1960 | Fleysher | 260—208 X |

FOREIGN PATENTS

| 517,475 | 1/1940 | Great Britain | 106—309 |
| 1,062,256 | 3/1967 | Great Britain | 260—208 |

FLOYD D. HIGEL, Primary Examiner

U.S. Cl. X.R.

260—176